United States Patent [19]
Ishigaki et al.

[11] Patent Number: 5,332,592
[45] Date of Patent: Jul. 26, 1994

[54] PROCESS FOR PRODUCING EXTRUDED NOODLE CAPABLE OF BEING INSTANTLY COOKED

[75] Inventors: Takayoshi Ishigaki, Tokyo; Hiroshi Saito, Utsunomiya; Akio Fujita, Tsurugashima, all of Japan

[73] Assignee: Ishigaki Foods Company Limited, Tokyo, Japan

[21] Appl. No.: 689,876

[22] PCT Filed: Sep. 29, 1989

[86] PCT No.: PCT/JP89/00995

§ 371 Date: May 24, 1991

§ 102(e) Date: May 24, 1991

[87] PCT Pub. No.: WO90/03120

PCT Pub. Date: Apr. 5, 1990

[30] Foreign Application Priority Data

Sep. 29, 1988 [JP] Japan .................. 63-245192

[51] Int. Cl.$^5$ ............................................. A23L 1/16
[52] U.S. Cl. ................................. 426/451; 426/439; 426/518; 426/557
[58] Field of Search ................ 426/451, 557, 439, 518

[56] References Cited

U.S. PATENT DOCUMENTS

| | | |
|---|---|---|
| 3,997,676 | 12/1976 | Ando . |
| 4,243,690 | 1/1981 | Murakami et al. ............ 426/557 |
| 4,590,083 | 5/1986 | Hatsugai et al. ............. 426/557 |
| 4,816,281 | 3/1989 | Moriyama et al. ............ 426/557 |

FOREIGN PATENT DOCUMENTS

| | | |
|---|---|---|
| 56-36896 | 8/1981 | Japan . |
| 58-16653 | 1/1983 | Japan . |
| 0051859 | 3/1983 | Japan ........................ 426/557 |
| 0179451 | 10/1983 | Japan ........................ 426/557 |
| 0025653 | 2/1984 | Japan ........................ 426/557 |
| 0028446 | 2/1984 | Japan . |
| 60-6172 | 1/1985 | Japan . |
| 62-51968 | 3/1987 | Japan . |
| 2143661 | 6/1987 | Japan ........................ 436/557 |
| 248366 | 10/1988 | Japan . |

Primary Examiner—Jeanette Hunter
Assistant Examiner—Mary S. Mims
Attorney, Agent, or Firm—Larson and Taylor

[57] ABSTRACT

In accordance with this invention, a starting powder mixture composed of raw tapioca starch mixed with durum semolina and/or wheat flour is kneaded together with water added thereto, and the resulting kneaded dough material is passed through an extruder, whereby the dough material is extruded to provide extruded raw noodle strings each having at least one groove extending longitudinally in the noodle string. Or alternatively, said kneaded dough material is extruded through an extruder to form a web of the dough for use in the formation of noodle, and the resulting noodle-forming, extruded dough web is engraved to form therein a plurality of parallel grooves extending in the direction of the extrusion molding. The resulting noodle-forming dough web having a plurality of the grooves is cut by means of cutting blade(s) at the zones of the web interposed between the respective grooves of the web to provide raw noodle strings each having at least one groove extending longitudinally in the noodle string. Then, the resulting extruded raw noodle strings having the grooves are steamed in a steamer and subsequently treated so as to absorb water therein in order to increase the water content of the noodle strings to a water content of 38 to 50% by weight, followed by frying the these noodle strings in oil. Thereby, such extruded noodle capable of being instantly cooked can be produced, which is useful as a food product.

10 Claims, 2 Drawing Sheets

PROCESS FOR PRODUCING EXTRUDED NOODLE CAPABLE OF BEING INSTANTLY COOKED

TECHNICAL FIELD

This invention relates to a process for producing extruded noodle capable of being instantly cooked in which the formation of the noodle strings or strands is performed by extrusion of the starting dough. More particularly, this invention relates to a process for producing such extruded noodle capable of being instantly cooked, which is in the form of noodle having been shaped by the extrusion, such as the extruded elongate pasta and "Udon" noodle, namely Japanese style noodle, which is provided by preliminarily cooking raw extruded noodle strings or strands to their edible soft state and then converting the so cooked noodle strings or strands into their dried and hard state, and which has such an instantly cookable property that the dried noodle, after being supplied to consumers, is restorable to their favorably eatable and edible soft state in a short time by simply pouring a volume of hot water onto and over the noodle with keeping the noodle immersed in the resultant hot water pool for several minutes, and also which has such property that the noodle so instantly cooked can exhibit an elastic chewiness which is shown characteristically and essentially by the usual, extruded noodles.

BACKGROUND ART

Hithertobefore, the extruded noodles such as macaroni, spaghetti and other similar elongate pastas are usually produced by passing a noodle-forming raw dough through a extruder having die holes with exerting a high pressure on the dough and thereby extruding said dough into the noodle shape by means of the extruder, when the raw noodle strings or strands are to be formed from said dough. Owing to the extrusion under pressure, the inner texture of the extruded noodles so produced can show a much more highly tight state than that of the raw, rolled-and-cut noodles which are usually produced by rolling the noodle-forming raw dough into a dough web for use in the formation of noodle by means of a roller and then cutting the resulting noodle-forming dough web thinly into noodle strings or strands by means of cutting blade(s). When trying is done to process the raw extruded noodle having the highly tight texture for a purpose that the extruded noodle would be imparted with the aforesaid instantly cookable property, this purpose usually cannot be achieved by merely processing the raw extruded noodle in the same way as in the known methods of processing the raw, rolled-and-cut noodles to make these noodles instantly cookable, by which methods the raw, rolled-and-cut noodle can successfully be imparted with the desired instantly cookable property. Thus, even if the raw extruded noodle is simply subjected to the known methods for processing the raw, rolled-and-cut noodles instantly cookablely, there can occur such problems that the extruded noodle having been so processed by the above-mentioned known methods of processing the rolled-and-cut noodles instantly cookably is not capable of being restored to the soft, cooked and favorably edible state in a short time upon simply pouring a volume of hot water onto and over the so processed noodles and keeping them in the resultant hot water pool, and that the extruded noodle having been processed by the known methods of processing the rolled-and-cut noodles instantly cookably cannot give a good chewiness to consumers after it has been restored to the edible state by immersing it in the pool of poured hot water for a while. For instance, there has been reported such a method for producing an oil-fried noodle capable of being cooked instantly, which comprises admixing potato starch and edible oil with wheat flour in a proportion of 15-70% by weight of the potato starch based on the weight of wheat flour and in a proportion of 1-4% by weight of the edible oil based on the weight of wheat flour, kneading the resultant starting flour mixture together with water added thereto, rolling the resulting kneaded dough material into the shape of a noodle-forming dough web by means of roller, cutting the rolled dough web by cutting balde(s) to form noodle strings or strands, steaming the noodle strings or strands in a steamer, then treating the steamed noodle strings so as to absorb water therein in order to increase the water content of the noodle strings to a water content of 40-50% by weight, and frying in oil the noodle strings having absorbed water. This method is said to provide such a noodle product which can give a chewiness similar to that of the rolled-and-cut noodles which have been cooked in a usual way without having been fried in oil (see Japanese patent No. 1,110,720 published under Japanese patent publication "Kokoku" No. 36896/81).

Nonetheless, when the method of the Japanese patent No. 1,110,720 is simply applied to for the production of the extruded and elongate pasta such as spaghetti and the like, the noodle product so produced by said method can exhibit such drawbacks that the resultant noodle product is not restorable to a favorably edible state in a short time upon simply pouring a volume of hot water to the noodle and keeping the noodle immersed in the resultant hot water pool, and that the noodle so treated by immersion in the pool of the poured hot water shows a chewiness which is not elastic.

In these circumstances, various methods were proposed in the past for the production of the extruded noodles having the instantly and favorably cookable property. For instance, there has been proposed such a method for preparing macaroni capable of being cooked instantly and giving good chewiness, which comprises providing a non-kneaded mixture of wheat flour with water containing wheat flour as main component and having a water content of 25-35% based on the weight of said mixture, granulating said non-kneaded mixture of wheat flour with water into the form of granules, preliminarily steaming the resultant granules with the granules being placed on and dispersed over a flat plate, extruding the so steamed granular material into the form of macaroni by passage through an extruder, then applying optionally water onto the surfaces of the noodle strings as formed, subsequently steaming the noodle strings in a steamer, and finally drying the steamed noodle strings (see Japanese patent No. 1,097,491 published under Japanese patent publication "Kokoku" No. 39614/81). However, the instant pasta product as produced by the method of Japanese patent No. 1,097,491 is actually not capable of being restored to a soft and favorably edible state in a short time when a volume of hot water is poured to the pasta with subsequently keeping it immersed in the hot water pool. Besides, this pasta product yet cannot give an elastic chewiness essentially characteristic to the usual pastas to a satisfactory extent.

Taking into account the above actual situation of the prior art methods, we, the present inventors, have made various studies in an attempt to provide such an extruded noodle capable of being cooked instantly which is readily restorable to a favorably edible state in a short time only by simply pouring a volume of hot water to the noodle placed in a vessel and keeping the noodle in the resultant hot water pool, and which can give the elastic chewiness or palatability characteristic to the usual, extruded elongate pastas or noodles. As a result, we have now found that an instantly cookable, extruded noodle product having the desired excellent properties can be obtained when the extruded noodle is produced by a new process which comprises steps of providing and using a noodle-forming raw dough material containing a proportion of raw tapioca starch, extruding this dough material into noodle strings or strands, with forming one groove or several grooves which extends or extend longitudinally in the noodle strings as extruded, steaming the raw noodle strings having the groove(s) in a steamer, then treating the steamed noodle strings so as to absorb water therein and thereby to increase the water content of the noodle to a predetermined degree, and subsequently frying the noodle strings with the increased water content in oil. Further, we have found that if any one of the steps and the operating requirements as stipulated in the present inventors' new process is omitted, it is disadvantageously likely to invoke that the surfaces of the noodle strings would readily blister during the oil-frying step of the process, that the noodle during the immersion in the pool of the poured hot water would be difficult to be restored to the soft and favorably edible state, and that the noodle, even after being restored to the edible state, would exhibit chewiness or palatability which is not elastic. On the basis of these findings, we have accomplished this invention.

DISCLOSURE OF THE INVENTION

In a first aspect of this invention, therefore, there is provided a process for producing extruded noodle capable of being instantly cooked, characterized in that the process comprises kneading a starting powder mixture composed of raw tapioca starch mixed with durum semolina and/or wheat flour, together with water added to said powder mixture, passing the resulting kneaded dough material through an extruder so that the dough material is extruded by said extruder to obtain extruded raw noodle strings each having at least one groove extending longitudinally in the noodle string, or, alternatively extruding said kneaded dough material by passing through an extruder so as to obtain a noodle-forming web of the dough, engraving the resulting noodle-forming, extruded dough web to form in said web a plurality of parallel grooves extending in the direction of the extrusion, cutting the resulting noodle-forming dough web having a plurality of the grooves by means of cutting blade(s) at the zones of said web interposed between the respective grooves of the web to obtain raw noodle strings each having at least one groove extending longitudinally in the noodle string, then steaming the raw noodle strings each having the groove, subsequently treating the noodle strings so as to absorb water in order to increase the water content of the noodle strings to a water content of 38 to 50% by weight, and thereafter frying these noodle strings in oil.

In accordance with this invention, by the term that the extruded noodle as produced is "capable of being instantly cooked" is meant that said noodle is restorable to the completely cooked conditions of the noodle along with the soft and favorably edible state only by simply pouring a sufficient volume of hot water, for example, a hot water at about 95°-100° C. onto and over the noodle and then keeping the noodle immersed in the resulting pool of the poured hot water for a short time, for example, for about 3 to 5 minutes or for about 8 minutes at longest.

In a second aspect of this invention, there is further provided a process for producing extruded noodle capable of being instantly cooked, which comprises kneading a starting powder mixture composed of raw tapioca starch mixed with durum semolina and/or wheat flour, together with water added to said powder mixture, passing the resulting kneaded dough material through an extruder so that the dough material is extruded by said extruder to obtain extruded raw noodle strings each having at least one groove extending longitudinally in the noodle string, then steaming the raw noodle strings each having the groove to such an extent that the starch present in the core part of each noodle string still remains in the state of $\beta$-starch while the $\beta$-starch present in the surface layer of each noodle string has been gelatinized to $\alpha$-starch, then treating the steamed noodle strings so as to absorb water in order to increase the water content of the noodle strings to a water content of 38 to 50% by weight, and then frying these noodle strings in an edible oil at a temperature of 110° to 130° C. to such an extent that the $\beta$-starch present in the noodle strings has been entirely gelatinized to $\alpha$-starch, whereas the grooves in the noodle strings have been closed only partially.

BEST MODES FOR WORKING THE INVENTION

In the processes of this invention, there is firstly prepared such a starting powder mixture composed of raw tapioca starch mixed with durum semolina and/or wheat flour. This powder mixture is then admixed with an appropriate volume of water, followed by kneading the resulting whole admixture to provide a dough material for use in the formation of noodle. Raw tapioca starch which is termed in accordance with this invention indicates a tapioca starch which has not been gelatinized to $\alpha$-starch to a substantial extent. Assumed that the processes of this invention are carried out using other starch than the raw tapioca starch, the objects of this invention are not achievable, since there is not obtained such noodle product which can give the elastic chewiness when the restoration of the such noodle product to the edible state is effected by immersing the noodle in the pool of the poured hot water for a short time. It is especially preferred in this invention that the proportion of raw tapioca starch incorporated in the starting powder mixture employed is in a range of 15-45% based on the weight of the starting powder mixture. Raw starches which may be incorporated in the starting powder mixture in addition to the raw tapioca starch include, for example, durum semolina, strong wheat flour, semi-strong wheat flour and the like. Durum semolina and various wheat flours may be selected and incorporated in appropriate combination and in appropriate proportions, depending on the sort of the extruded noodle such as elongate pastas and Japanese style "Udon" noodle to be produced. The aforesaid starting powder mixture may then be admixed with water in an amount of water in a range of 25-35%, preferably 28-34% by weight based on the weight of the starting powder mixture, followed by kneading the resulting whole admixture well to give a dough material for use in the formation of noodle.

The starting powder mixture composed of raw tapioca starch mixed with durum semolina and/or wheat flour which is employed in the processes of this invention may preferably contain raw tapioca starch in a proportion of 15-45% by weight and also contain durum semolina or strong wheat flour or semi-strong wheat flour or two or three of them in a proportion or proportions of 85-55% by weight based on the weight of said powder mixture. It is preferable that the starting powder mixture mentioned just above is admixed with water in an amount of water in a range of about 25-35%, preferably 28-34% based on the weight of the starting powder mixture and, if desired, also with a proper amount(s) of con, non salt and/or any other seasoning mix, the resulting admixture is mixed well and uniformly, and the uniform mixture so obtained is kneaded well to give the kneaded dough material, namely a dough-like mass having such a degree of the consistency that is suitable for the formation of noodle strings by the extrusion of the kneaded dough material through an extruder.

Then, the kneaded dough material so obtained is passed through an extruder so as to form raw noodle strings which are provided with groove(s) extending in the lengths of the noodle strings.

The formation of the noodle strings having groove(s) from the kneaded dough material by the extrusion process may be conducted by a known method disclosed in the specifications of U.S. Pat. No. 4,752,205 and U.S. Pat. No. 4,816,281, or in Japanese patent application first publications "Kokai" No. 6172/85 or "Kokai" No. 248366/88 specification. As described in the above-mentioned U.S. patent specifications, the extruding die which is arranged in the extruder employed for the extrusion process to the above-mentioned end is provided with a plurality of through-holes, through which the noodle-forming kneaded dough material is extruded, and which through-holes each have therein at least one projection projecting from the circumferential wall surface of each through-hole inwardly towards the central axis of the through-hole, with said projection having a cross-sectional configuration corresponding to or coincident with the cross-sectional configuration of the groove cut in the noodle string to be formed. The groove extending in the length of the noodle string may have any cross-sectional configuration of a wedge-shape, a rectangle shape, a U-letter shape etc., but is preferably in of a wedge (V)-shape in particular. FIG. 1a or FIG. 1b of the accompanying drawings shows diagrammatically the traverse cross-section of a noodle string (1) in which a groove (2) having a V-shaped cross-section is formed. FIG. 1c of the accompanying drawings shows the traverse cross-section of a noodle string (1) in which a groove of a U-shaped cross-section is formed. The number of the groove cut in one noodle string may be one, two, three or four or more. Where a single wedge-shaped groove is formed in each noodle string, it is preferable to form the wedge-shaped groove longitudinally extending in the noodle string, such that the cross-sectional configuration of the wedge-shaped groove is tapered like the V-letter shape towards the central axis of the noodle string, the depth of the groove is of a length of ½ to ¾ of the diameter of an imaginary, traverse cross-section of the noodle string and the angle of the V-shaped groove opened at the bottom of the groove is in a range of 20°-45°. In this case, such wedge-shaped groove as formed according to the above-mentioned embodiment is very much appropriate, because such wedge-shaped groove can be closed when the noodle product having such wedge-shaped groove which was produced by the processes of this invention has been restored to the edible state by the treatment with hot water, with the noodle string having been swollen. In FIG. 1a, there is diagrammatically shown the traverse cross-section of a noodle string (1) in which one single wedge-shaped groove (2) is provided in the noodle string to a depth of about ⅔ of the diameter of the noodle string. Further, the formation of the groove to be provided in the noodle string is convenient to be performed at the same time as when the extrusion of the dough into the noodle strings is done, in such a way that the extrusion of the dough is effected using such an extruder provided with an extrusion-die (3) which is diagrammatically shown by the perspective view thereof in FIG. 2 of the accompanying drawings, and of which each extruding through-hole (4) is fitted with a projection (7) of an appropriate shape. On the other hand, it is also possible that the kneaded dough material for use in the formation of the noodle strings is passed through an extruder to form a sheet of the noodle-forming web made of the dough, and then pallarel grooves are formed in the noodle-forming dough web by engraving in an appropriate manner, followed by cutting the grooved dough web thinly by means of cutting blade(s) or the like to form the noodle strings.

The grooved raw noodle strings so obtained may subsequently be cut to a suitable length, for example, a length of about 10 to 40 cm which is suitable for consumers to eat the noodle, and thereafter the raw noodle strings of a reduced length are steamed in a steamer so that the starch positioned in the surface layer of the noodle string is gelatinized to alpha-starch. This steaming treatment may preferably be conducted under such conditions that the temperature of steam, namely hot water vapor used is at 95° to 100° C. and the time of the steaming treatment is in the order of 3 to 10 minutes. According to this steaming procedure, the starch positioned in the inner, core part of each noodle string body can remain in the state of beta-starch even after the steaming treatment has been finished.

In a step subsequent to this steaming treatment, the steamed noodle strings are treated with water so that the noodle strings absorb water therein to increase the water content of the noodle strings to a water content of 38 to 50%. If the noodle strings after this step for treating the noodle to absorb water have only a water content of less than 38%, it happens that the $\beta$-starch remaining in the noodle string body can only incompletely be converted into the $\alpha$-starch in the subsequent step of frying the noodle in oil, so that the noodle product as then produced can exhibit a poor, instantly cookable property upon its cooking with the poured hot water and is difficult to give the desired elastic chewiness. Again, if the noodle strings after the step for treating the noodle to absorb water have got a water content of higher than 50%, the water content present in the surface layer of the noodle string is very much excessive so that the surface layer of the noodle can be swollen undesirably too much. Due to this, there can occur undesired problems that the noodle becomes difficult to be handled in the subsequent steps of the process, with simultaneously involving undesired deformation of the noodle strings and mutual adhesions of the noodle strings, and so on. Furthermore, the method of treating the noodle strings with water to absorb water therein may be effected by any of a method of immersing the noodle strings in water, a method of showering the noodle strings with water, and the a method of spraying the noodle strings with water spray, for example. As compared to the use of simple water, it is preferred that an oil-in-water emulsion containing an edible oil at an oil content of 2 to 20% is used in the step of treating the noodle with water for the water-absorption.

After the step of treating the noodle strings with water to absorb water is done, the noodle strings having absorbed water are then fried in oil as a next step. It is necessary that the oil-frying step is carried out in an oil at a temperature of 110° to 130° C. under normal pressure. That the oil-frying step is conducted for 4 to 10 minutes is especially advantageous to ensure that the noodle product as then produced can obtain excellent restorability of the noodle.

If the oil-frying step is carried out at a temperature of lower than 110° C., the oil-frying time as required can be too long. On the other hand, if the oil-frying step is done at a temperature of higher than 130° C., the surface of the noodle strings is much more likely to blister and to be colorized deeply in the oil-fried noodle. Further, the oil-frying treatment of the noodle strings may preferably be conducted for such a time as requried to ensure that the water content is removed from the noodle strings to reach such a reduced water content at which the noodle strings after the oil-frying step can look dry at room temperature. It is preferred that the noodle strings after the oil-frying step have a water content of lower than about 10%.

Moreover, prior to the oil-frying step, it is feasible that the noodle strings having received the water-absorption step are again subjected to a second, steaming treatment at a temperature of 95° to 100° C. for a time of 10 minutes or less.

Figure 1A:
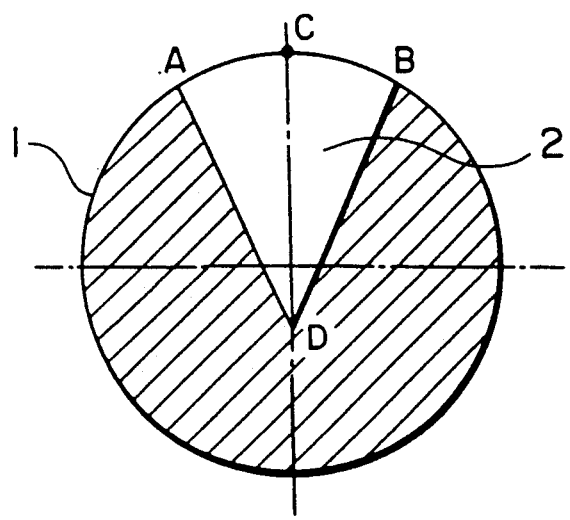
FIG. 1a of the accompanying drawings shows a diagrammatical view of the traverse cross-section of a noodle string (1) having a circular traverse cross-section in which one single groove (2) having a wedge-shaped cross-section is provided to extend longitudinally in the noodle string. The width of the opening of the groove (2) appearing in the traverse cross-section of the noodle string (1) shown in FIG. 1a is represented by arc line ABC, and the angle of the groove is represented by an angle formed between the line connecting the point A to the point D positioning at the bottom of the V-letter shaped groove and the line connecting the point D to the point B. Besides, the depth of the groove is represented by the length of the line which connects the point C to the point D.
Figure 1B:
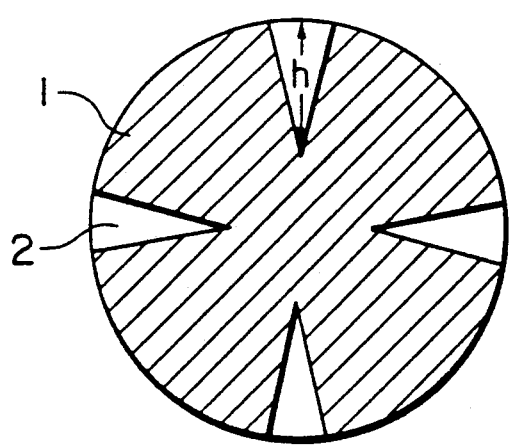
FIG. 1b shows a diagrammatical view of the traverse cross-section of a noodle string (1) having a circular traverse cross-section in which four grooves (2) having the wedge-shaped cross-section are provided to a depth (h).
Figure 1C:
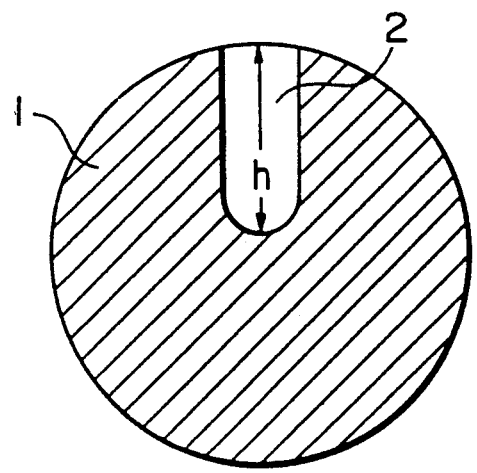
FIG. 1c shows a diagrammatical view of a noodle string (1) having a circular traverse cross-section in which a single groove (2) having a U-letter shaped cross-section is provided to a depth (h).
Figure 2:
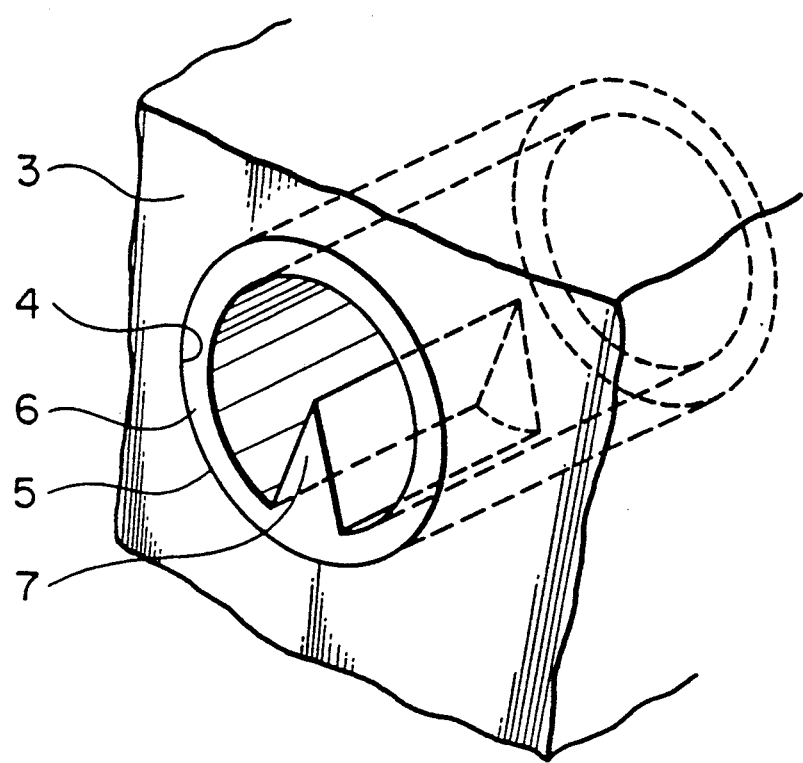
FIG. 2 shows a perspective view of an extruding die (3) arranged in an extruder which can be used in the processes of this invention. In the extruding die (3) are provided many of through-hole (4) and projection (7) which has a wedge-shaped cross-section and projects inwardly within each through-hole- A sleeve member (5) is engaged fixedly with the inside of the through-hole (4) and the sleeve member (5) has its end face (6). The projection (7) is formed as an extension projecting from the sleeve member (5). The kneaded raw dough material for forming the noodle is forced to pass through the hollow hole in the sleeve member (5) and is extruded outwardly at the end face (6) of the sleeve so that noodle string having a single, wedge-shaped groove is produced.

Hereinafter, this invention is further illustrated with reference to the following Examples. In these Examples, parts are given in parts by weight, and percentages are given in % by weight.

EXAMPLE 1

A starting powder mixture composed of 50 parts of durum semolina, 25 parts of strong wheat flour and 25 parts of raw tapioca starch was admixed with 32 parts of water, and the resulting admixture was kneaded in a mixer. The kneaded dough material so obtained was extruded by passing through a spaghetti-producing extruder provided with an extruding die, of which the through-holes for passage of the dough therethrough were each fitted with a wedge-shaped projection. In this way, raw spaghetti-noodle strings with 2.0 mm thickness (having a water content of 31%) were obtained, of which each noodle string had one wedge-shaped groove extending longitudinally in the length of the noodle string. The dimensions of the wedge-shaped groove formed in this spaghetti-noodle string were such that the depth of the groove corresponded to ⅔, namely a two-third of the diameter of the traverse cross-section of the noodle string and the angle of the groove at its bottom was 35° C.

These raw spaghetti-noodle strings were cut to a length of about 30 cm and divided into proper serving units of a predetermined weight suitable for single eating, and the noodle strings of each unit were then placed in one vessel and steamed in a steamer for 5 minutes under steam, namely hot water vapor at 98° C. The steamed noodle strings were subsequently immersed in water to allow the noodle strings to absorb water therein so that the water content of the spaghetti-noodle strings was increased to 43%. Then, the noodle strings having the increased water content were fried in an edible oil at a temperature of 120° to 130° C. for 6 minutes to obtain spaghetti-noodle which had a water cotnent of 9% and was capable of being cooked instantly to the state of "ready-to-eat".

When the spaghetti-noodle product as produced in the above was placed in a vessel and hot water (at a temperature above 96° C.) was then poured onto and over the noodle in the vessel, with keeping the noodle immersed in the resulting hot water pool, the noodle product could get the favorably edible state already in 5 minutes of the immersion. The noodle so cooked showed such chewiness which was good and elastic characteristically to the usual spaghetti-noodles as cooked.

EXAMPLE 2

A starting powder mixture composed of 55 parts of durum semolina and 45 parts of raw tapioca starch was admixed with 33 parts of water, and the resulting admixture was kneaded in a mixer. The resulting kneaded dough material was extruded by a spaghetti-producing extruder which was similar to that employed in Example 1. In this way, raw spaghetti-noodle strings with 2.0 mm thickness (having a water content of 32%) were obtained, of which each noodle string had one wedge-shaped groove extending longitudinally in the length of the noodle string. The dimensions of the wedge-shaped groove formed in the spaghetti-noodle string were such that the depth of the groove corresponded to ½, namely one half of the diameter of the traverse cross-section of the noodle string and the angle of the groove was 45°.

These raw spaghetti-noodle strings were cut to a length of about 30 cm and divided into proper serving units of a predetermined weight suitable for single eating, and the noodle strings of each unit were placed in a vessel and steamed in a steamer for 5 minutes under steam, namely hot water vapor at 98° C. The steamed noodle strings were subsequently showered with water to allow the noodle strings to absorb water therein, so that the water content of the spaghetti-noodle was increased to 38%. Then, the noodle strings having the increased water content were fried in an edible oil at a temperature of 125° to 130° C. for 4 minutes to obtain spaghetti-noodle which had a water content of 8% and was capable of being cooked instantly to the state of "ready-to-eat".

The spaghetti-noodle product as produced in the above was placed in a vessel and hot water (at a temperature above 96° C.) was then poured onto and over the noodle in the vessel, with keeping the noodle immersed in the resulting hot water pool, when the noodle product could get the favorably edible state already in 5 minutes of the immersion. The noodle so cooked showed such chewiness which was good and elastic characteristically to the usual spaghetti-noodles as cooked.

EXAMPLE 3

A starting powder mixture composed of 70 parts of durum semolina, 15 parts of strong wheat flour and 15 parts of raw tapioca starch was admixed with 31 parts of water, and the resulting admixture was kneaded in a mixer. The kneaded dough material so obtained was extruded by passing through a spaghetti-producing extruder in the same manner as in Example 1. In this way, raw spaghetti-noodle strings with 2.0 mm thickness (having a water content of 30%) were obtained, of which each noodle string had one wedge-shaped groove extending longitudinally in the noodle string. The dimensions of the wedge-shaped groove formed in this spaghetti-noodle string were such that the depth of the groove corresponded to ¾ of the diameter of the traverse cross-section of the noodle string and the angle of the groove was 20°.

These raw spaghetti-noodle strings were cut to an appropriate length and divided into proper serving units of a predetermined weight suitable for single eating, and the noodle strings of each unit were then placed in one vessel and steamed in a steamer for 7 minutes under steam, namely hot water vapor at 98° C. The steamed noodle strings were subsequently immersed in water to allow the noodle strings to absorb water therein so that the water content of the spaghetti-noodle strings was increased to 50%. Then, the noodle strings having the increased water content were fried in an edible oil at a temperature of 110° to 125° C. for 8 minutes to obtain spaghetti-noodle which had a water content of 9% and was capable of being cooked instantly to the state of "ready-to-eat".

The spaghetti-noodle product as produced in the above was placed in a vessel and hot water (at a temperature above 96° C.) was then poured onto and over the noodle in the vessel, with keeping the noodle immersed in the resulting hot water pool, when the noodle product could get the favorably edible state already in 5 minutes of the immersion. The noodle so cooked showed such chewiness which was good and elastic characteristically to the usual spaghetti-noodles as cooked.

EXAMPLE 4

A starting powder mixture composed of 75 parts of semi-strong wheat flour and 25 parts of raw tapioca starch was admixed with 32 parts of water, and the resulting admixture was kneaded in a mixer. The resulting kneaded dough material was extruded by a spaghetti-producing extruder in the same manner as in Example 1. In this way, raw Japanese style "Udon" noodle strings (having a water content of 31%) were obtained, of which each noodle string had one wedge-shaped groove extending longitudinally in the length of the noodle string. The dimensions of the wedge-shaped groove formed in the "Udon" noodle string were such that the depth of the groove corresponded to ⅔ of the diameter of the traverse cross-section of the noodle string and the angle of the groove was 35°.

These "Udon" strings were placed in a vessel and steamed in a steamer for 5 minutes under steam, namely hot water vapor at 98° C. The steamed noodle strings were subsequently immersed in water to allow the noodle strings to absorb water therein, so that the water content of the "Udon" noodle was increased to 43%.

The noodle having the increased water content was again steamed under steam at 98° C. for 5 minutes to effect the second, steaming treatment of the noodle. Then, the noodle strings having received the second, steaming treatment were fried in an edible oil at a temperature of 123° to 130° C. for 10 minutes to obtain "Udon" noodle which had a water content of 9% and was capable of being cooked instantly to the state of "ready-to-eat".

The "Udon" noodle product as produced in the above was placed in a vessel and hot water (at a temperature above 96° C.) was then poured onto and over the noodle in the vessel with keeping the noodle immersed in the resulting hot water pool, when the noodle product could get the favorably edible state already in 5 minutes of the immersion. The noodle so cooked showed such chewiness which was elastic characteristically to the extruded noodles.

COMPARATIVE EXAMPLE 1

The procedure of Example 1 was repeated, except that 25 parts of raw tapioca starch used in Example 1 were replaced by 25 parts of potato starch. There was thus obtained a spaghetti noodle which was capable of being instantly.

A volumne of hot water (above 96° C.) was poured onto and over this spaghetti noodle product placed in a vessel, followed by keeping the noodle immersed in the resulting pool of the poured hot water, when the noodle so cooked could get the edible state in 5 minutes of the immersion in hot water. However, the noodle so cooked gave such chewiness which was not elastic but was too soft and gave certain pasty feeling to teeth, so that the cooked noodle could not give any well satisfactory palatability as spaghetti.

COMPARATIVE EXAMPLE 2

The procedure of Example 1 was repeated, except that 25 parts of raw tapioca starch used in Example 1 were replaced by 25 parts of corn starch. There was thus obtained a spaghetti noodle which was capable of being instantly. A volume of hot water (above 96° C.) was poured onto and over this spaghetti noodle product placed in a vessel, followed by keeping the noodle immersed in the resulting pool of the poured hot water, when the noodle so cooked could get the edible state in 5 minutes of the immersion in hot water. However, the noodle so cooked gave such chewiness which was poorly elastic, so that the cooked noodle could not give any well satisfactory palatability as spaghetti.

COMPARATIVE EXAMPLE 3

The procedure of Example 1 was repeated, except that raw tapioca starch used in Example 1 was omitted but 75 parts of durum semolina and 25 parts of strong wheat flour were employed. There was thus obtained a spaghetti noodle. When a volume of hot water (above 96° C.) was poured over this spaghetti noodle placed in a vessel, followed by keeping the noodle immersed in the pool of the poured hot water, the noodle so cooked was not restored to the edible state but retained a hard state even after immersion time of 8 to 10 minutes elapsed. The so cooked noodle did not have the favorably edible state.

COMPARATIVE EXAMPLE 4

The procedure of Example 1 was repeated, except that spaghetti noodle strings having a circular cross-section were produced without the wedge-shaped groove being formed in the noodle string. There was thus obtained a spaghetti noodle. This spaghetti noodle product as obtained had finely blistered surfaces in the noodle strings. When a volume of hot water (above 96° C.) was poured over this noodle product placed in a vessel, followed by keeping the noodle immersed in the resulting hot water pool, the surface layers of the noodle strings became too soft and be swollen very much, whereas the whole bodies of the noodle strings remained in a hard state even after elapse of the immersion time for 10 minutes. Besides, the central part of the noodle strings could not yet have the edible state.

COMPARATIVE EXAMPLE 5

The procedure of Example 1 was repeated, except that the noodle strings were steamed in the same manner as in Example 1 but the steamed noodle strings were then immersed in water for a reduced time so that the water content of the noodle strings increased only to a limited water concent of 36%. There was thus obtained a spaghetti noodle which was capable of being instantly. When a volume of hot water (above 96° C.) was poured over this noodle spaghetti noodle product with subsequently keeping the noodle immersed in the resulting hot water pool, the noodle so cooked remained in a hard state and got no edible state even after elapse of the immersion time for 5 minutes, and an immersion time of 7 minutes was required to make the noodle restored to the edible state. However, the restored noodle did not show the chewiness which was elastic.

COMPARATIVE EXAMPLE 6

The procedure of Example 1 was repeated, except that the noodle strings were steamed in the same manner as in Example 1 but the steamed noodle strings were then immersed in water for a prolonged time so that the water content of the noodle strings increased to 52%. There was thus obtained a spaghetti noodle. The spaghetti noodle having thus absorbed water had an excessive water content so that the noodle strings could be adhered to each other before the oil-frying step was done. Besides, it was then found that the wedge-shaped grooves in the noodle strings had been closed. After the noodle strings having the excessive water content were subsequently fried in oil, the oil-fried noodle strings did not show uniform appearance and texture of the noodle string but the oil could poorly be drained out of the oil-fried noodle strings. When a volume of hot water was poured over the fried noodle strings placed in a vessel, with subsequently keeping the noodle immersed in the resulting hot water pool, the regions of the noodle strings which were adhereing to each other, as well as the regions of the noodle strings which were found in the initially closed grooves of the wedge-shaped cross-section present in the noodle strings did not have the edible state even after elapse of the immersion time of 5 minutes. The noodle so cooked showed a palatability which was not uniform.

INDUSTRIAL UTILITY OF THE INVENTION

As described hereinbefore, the processes of this invention make it feasible to produce such extruded noodles which are capable of being instantly, which are restorable to the favorably edible state in a very much short time only by simply pouring a volume of hot water onto and over the noodle product placed in a vessel, followed by keeping the noodle immersed in the resulting pool of poured hot water, and which can exhibit a chewiness or palatability with a high elasticity characteristic to the extruded and elongate pastas.

We claim:

1. A process for producing extruded, grooved, and oil-fried noodles capable of being instantly cooked, said process comprising:
   (i) providing a starting powder mixture comprising raw tapioca starch and at least one wheat-derived member selected from the group consisting of durum semolina, strong wheat flour and semi-strong wheat flour, said tapioca starch being present in an amount of 15-45% by weight based on the weight of the powder mixture and said wheat-derived member being present in an amount of from 85-55% by weight based on the weight of the powder mixture;
   (ii) mixing said starting powder mixture with water added in an amount of 25 to 35% by weight based on the weight of the starting powder mixture;
   (iii) kneading the resultant uniform admixture to obtain a kneaded dough material;
   (iv) passing the kneaded dough material through an extruder to obtain extruded raw noodle strings each having at least one groove extending longitudinally in the noodle string;
   (v) steaming said raw noodle strings in a first steaming stage;

(vi) treating the steamed noodle strings with water so as to absorb water therein to increase the water content of the noodle strings to a water content of 38 to 50% by weight;

(vii) steaming the noodle strings having absorbed water in a second steaming stage; and (viii) thereafter frying the steamed noodle strings in oil.

2. A process as claimed in claim 1, wherein step (v) comprises steaming the raw noodle strings to such an extent that the starch present in the core part of each noodle string remains in the state of β-starch while the β-starch present in the surface layer of each noodle string is gelatinized to α-starch, and wherein step (viii) comprises frying the steamed noodle strings in an edible oil at a temperature of 110° to 130° C. to such an extent that the β-starch present in the noodle strings has been entirely gelatinized to α-starch, the grooves in the fried noodle strings being only partially closed.

3. A process for producing extruded, grooved, and oil-fried noodles capable of being instantly cooked, said process comprising:

(i) providing a starting powder mixture comprising raw tapioca starch and at least one wheat-derived member selected from the group consisting of durum semolina, strong wheat flour and semistrong wheat flour, said tapioca starch being present in an amount of 15–45% by weight based on the weight of the powder mixture and said wheat-derived member being present in an amount of from 85–55% by eight based on the weight of the powder mixture;

(ii) mixing said starting powder mixture with water added in an amount of 25 to 35% by weight based on the weight of the starting powder mixture;

(iii) kneading the resultant admixture to obtain a kneaded dough material;

(iv) passing the kneaded dough material through an extruder to obtain an extruded noodle-forming web of the dough;

(v) engraving the resulting extruded noodle-forming dough web to form in said web a plurality of parallel grooves extending in the direction of the extrusion;

(vi) cutting the noodle-forming dough web at zones of said web interposed between respective grooves of the web to obtain raw noodle strings each having at least one groove extending longitudinally in the noodle string;

(vii) steaming the raw noodle strings in a first steaming stage;

(viii) treating the steamed noodle strings with water so as to absorb water therein to increase the water content of the noodle strings to a water content of 38 to 50% by weight;

(ix) steaming the noodle strings having absorbed water in a second steaming stage; and (x) thereafter frying the steamed noodle strings in oil.

4. A process as claimed in claim 1, wherein the extruder is provided with an extruding die which contains a plurality of through-holes for passage therethrough and extrusion of the kneaded dough material for formation of the noodle, wherein each of said through-holes is fitted with at least one projection extending from the inner wall face of the through-hole inwardly to the central axis of the through-hole, and wherein the cross-sectional configuration of said projection is coincident with the cross-sectional configuration of the groove to be formed in the noodle string.

5. A process as claimed in claim 1, wherein up to four grooves are provided in each noodle string, and wherein the cross-sectional configuration of each groove is in the shape of a wedge extending and being tapered towards the central axis of the noodle string, or U-shaped, or in the shape of a rectangle.

6. A process as claimed in claim 1 or claim 3, wherein the extruded raw noodle strings having the grooves are cut to a length of about 10 to 40 cm suitable for readily eating, before the raw noodle strings are subjected to steaming.

7. A process as claimed in claim 1 or claim 3, wherein the step of frying the noodle strings in oil is effected for a time sufficient to remove water from the noodle strings to an extent such that the noodle strings, after frying in step (viii), look dry at room temperature.

8. A process as claimed in claim 1 or claim 3 wherein frying is effected at a temperature of 110°–130° C. for 4–10 minutes.

9. A process according to claim 1 or claim 3 wherein steaming in said first steaming stage is effected under conditions such that the starch positioned in the surface layer of the noodle string is gelatinized to alpha-starch and such that the starch positioned in the inner, core part of each noodle string remains in the form of beta-starch.

10. A process according to claim 9 wherein steaming in said first steaming stage is effected in hot water vapor at 95°–100° C. for 3–10 minutes.

* * * * *